United States Patent Office 3,415,816
Patented Dec. 10, 1968

3,415,816
PREPARATION OF 2-OXO STEROIDS AND NOVEL
DERIVATIVES THEREOF
Robert L. Clarke, Bethlehem, N.Y., assignor to Sterling
Drug Inc., New York, N.Y., a corporation of Delaware
No Drawing. Filed Mar. 12, 1963, Ser. No. 264,661
25 Claims. (Cl. 260—239.5)

This invention relates to a process for the preparation of 2-oxo-steroids, including the preparation of androstan-17β-ol-2-one and its esters, to products formed by said process, and to products prepared by further chemical conversions of androstan-17β-ol-2-one which possess endocrinological and pharmacological properties, for example, anabolic, estrogenic, anti-adrenal, anti-pituitary, and hypotensive activities.

The process of aspect of the invention relates to a method for preparing 2-oxo-steroids having the A/B trans configuration which comprises heating a 2α-bromo-3-oxo-steroid having the A/B trans configuration with at least about three molar equivalents of a lower-alkylmercaptan, and hydrolyzing the product in the presence of dilute acid.

The reaction between the 2α-bromo steroid and lower-alkylmercaptan is preferably carried out in an inert solvent at a temperature between about 50° C. and 150° C.

A preferred aspect of the invention is concerned with a method for preparing androstan-17β-ol-2-one comprising heating a member of the group consisting of 2α-bromoandrostan-17β-ol-3-one and lower carboxylic acid esters thereof with at least about three molar equivalents of a lower-alkylmercaptan, and hydrolyzing the product in the presence of dilute acid.

The process is believed to take place according to the following sequence of reactions, as illustrated by the preparation of androstan-17β-ol-2-one:

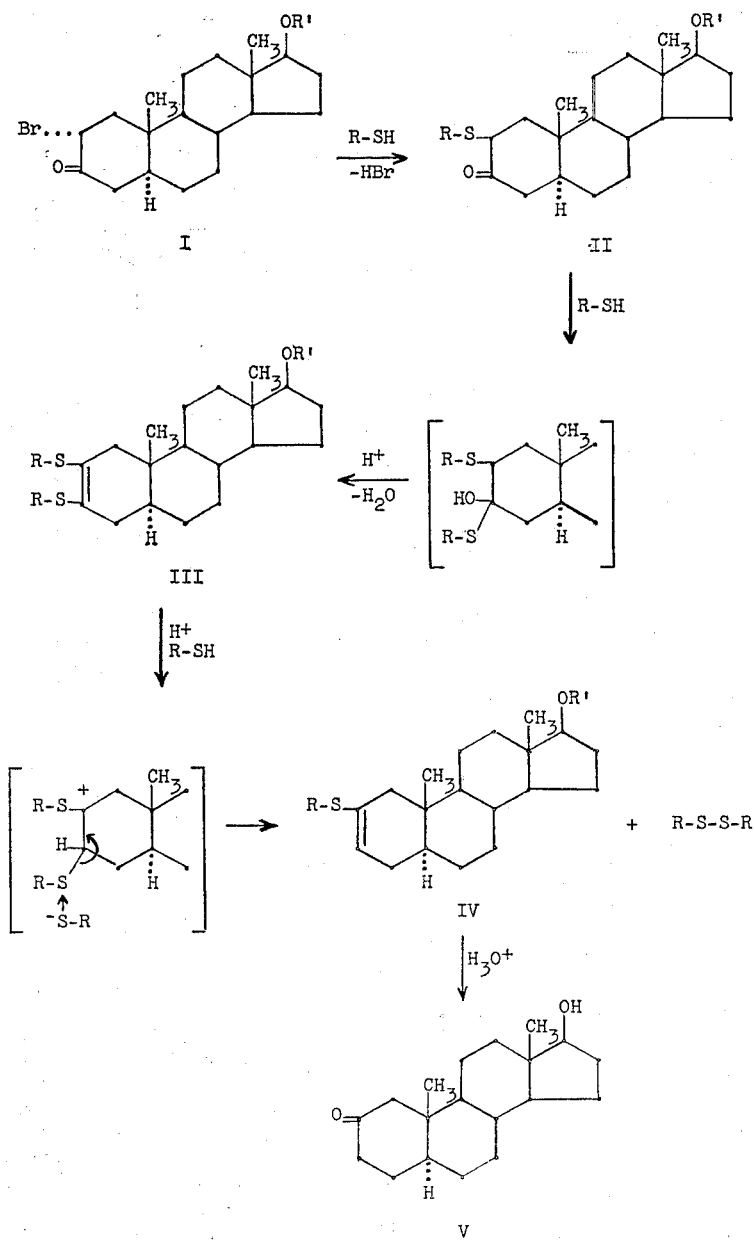

The intermediate III also reacts in the alternative fashion as follows:

By the alternative route, the intermediate III reacts with the lower-alkylmercaptan to give a 3-lower-alkyl-

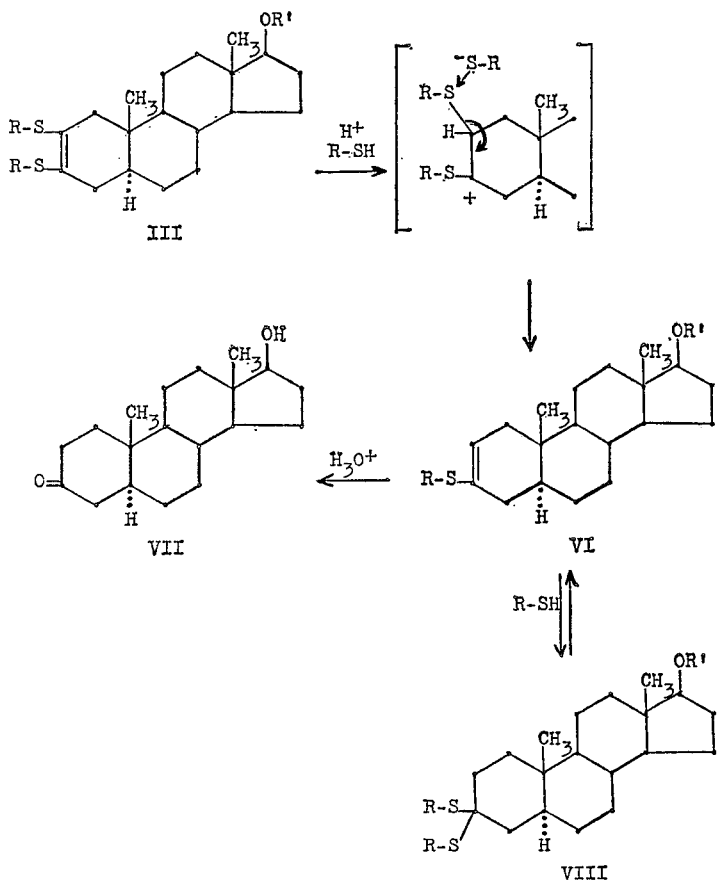

In the above formulas R stands for a lower-alkyl group preferably having from one to about six carbon atoms and R' stands for a member of the group consisting of hydrogen and lower-carboxylic acyl. When R' is lower-carboxylic acyl, the acyl radicals are preferably derived from carboxylic acids having from one to about ten carbon atoms, conventionally employed in the steroid art, and having a molecular weight less than about 200. Representative of the acyl radicals which are contemplated are lower-alkanoyl radicals, e.g., formyl, acetyl, propionyl, butyryl, isobutyryl, caproyl, heptanoyl, octanoyl, trimethylacetyl, and the like; carboxy-lower-alkanoyl radicals, e.g., succinyl (β-carboxypropionyl); cycloalkyl-lower-alkanoyl radicals, e.g., β-cyclopentylpropionyl, β-cyclohexylpropionyl, and the like; monocarbocyclic aroyl radicals, e.g., benzoyl, p - toluyl, p - nitrobenzoyl, 3,4,5 - trimethoxybenzoyl, and the like; monocarbocyclic aryl-lower-alkanoyl or -alkenoyl radicals, such as phenylacetyl, β - phenylpropionyl, cinnamoyl, and the like; and monocarbocyclic aryloxy-lower-alkanoyl radicals, such as p-chlorophenoxyacetyl, and the like.

Referring to the above flow sheets, the 2α-bromo-17β-oxyandrostan-3-one I reacts with a lower-alkylmercaptan to give as the initial product a 2-lower-alkylmercapto-17β-oxyandrostan-3-one II. Further addition of lower-alkylmercaptan followed by elimination of water gives a 2,3-bis(lower - alkylmercapto) - 17β - oxyandrostane III. Still further reaction of the lower-alkylmercaptan in the presence of acid results in elimination of di-lower-alkyl disulfide, R—S—S—R, and formation of a 2-lower-alkylmercapto-17β-oxy-2-androstene IV. The latter is readily hydrolyzed under acidic conditions to give 17β-hydroxyandrostan-2-one V. If esters of androstan-17β-ol-2-one are desired, they can be prepared by conventional esterification reactions as by heating with the appropriate acid halide or acid anhydride in pyridine solution.

mercapto-17β-oxy-2-androstene VI which is hydrolyzed with acid to 17β - hydroxyandrostan - 3 - one VII. The 3-lower-alkylmercapto-17β-oxy-2-androstene in the presence of excess lower-alkylmercaptan and acid catalyst forms a thioketal, 3,3 - bis(lower - alkylmercapto)-17β-oxyandrostane VIII.

Evidence for the above reaction mechanism is provided by the isolation of, or evidence of the presence of, intermediates II, III, IV and VI under varying conditions, and by the fact that the reaction produces approximately equal amounts of the 2-ketone V and the 3-ketone VII. The 2-ketone and 3-ketone are readily separated by making use of the fact that the latter forms an insoluble bisulfite addition product whereas the former does not. The 3-ketone can then be brominated to produce the starting material I or the preparation of additional 2-ketone.

A further aspects of the invention relates to lower-alkylsulfonyl compounds corresponding to the compounds of formulas III, IV, VI and VIII, wherein the sulfide —S— linkages are replaced by sulfonyl —SO$_2$— linkages. Said sulfonyl compounds are prepared by oxidizing the lower-alkylmercapto compounds with hydrogen peroxide or a peracid. Biological evaluation of the lower-alkylsulfonyl compounds has shown them to have endocrinological activity, e.g., anti-adrenal and anti-pituitary activities.

Androstan-17β-ol-2-one and its esters V are useful as intermediates in the preparation of other new and useful compounds also within the purview of the invention.

A Grignard reaction between androstan-17β-ol-2-one and methylmagnesium halide produces 2α-methylandrostane-2β,17β-diol, which has estrogenic activity.

Androstan-17β-ol-2-one can be caused to react with ethyl formate in the presence of a strong base, such as an alkali metal lower-alkoxide, hydride or amide, to give 3-hydroxymethyleneandrostan-17β-ol-2-one. The latter in turn reacts with a secondary amine, B=N—H, to give a compound having the formula

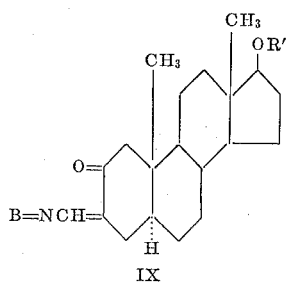

wherein R' is hydrogen and B=N is a member of the group consisting of di - lower - alkylamino, 1 - piperidyl, lower-alkylated 1-piperidyl, 1 - pyrrolidyl, lower-alkylated 1 pyrrolidyl, 4-morpholinyl, lower-alkylated 4-morpholinyl, 1-piperazinyl, and 4-lower-alkyl-1-piperazinyl. Compounds of Formula IX where R' is lower-carboxylic acyl are obtained by esterifying the 17-hydroxy compounds with the appropriate acid halide or acid anhydride. The compounds of Formula IX are useful as hypotensive agents. Each member of the group defining N=B has this activity.

3-hydroxymethyleneandrostan - 17β - ol-2-one is also a valuable intermediate in preparing heterocyclic substituted steroids having anabolic properties. For example, it reacts with hydrazine to form 17β-hydroxyandrostano[2,3-c]pyrazole, and with hydroxylamine to form 17β-hydroxyandrostano[2,3 - c]isoxazole and the isomeric [3,2 - d] isoxazole. The isomeric isoxazoles can be separated by making use of the fact that the [3,2,-d]isoxazole is readily cleaved by alkali to form the base-soluble 3β-cyanoandrostan-17β-ol-2-one, whereas the [2,3-c]isoxazole is stable to alkali. The 17β - hydroxy group in the heterocyclic steroids can be esterified by conventional esterification procedures.

The structures of the compounds of the invention were established by the modes of preparation, by chemical properties, by elementary analysis, and ultraviolet and infrared spectra.

The invention is illustrated by but not limited to the following examples.

EXAMPLE 1.—Reaction of 2α-bromo-17β-acetoxyandrostan-3-one with n-propylmercaptan A mixture of 20 g. (0.049 mole) of 2α-bromo-17β-acetoxyandrostan-3-one I, 15.2 g. (0.2 mole) of n-propylmercaptan and 250 ml. of chloroform was refluxed under nitrogen for six hours. The solvent was removed at below 60° C. under 15 mm. pressure. The pressure was then lowered to 0.08 mm., whereupon 5.6 g. of slightly impure dipropyl disulfide distilled, B.P. 37–40° C. (0.08 mm.) or 195–196° C. (1 atm.), $n_D^{25}$ 1.4952. Its infrared spectrum was found to be identical with that of an authentic sample.

The residual reaction mixture was then heated at 100° C. for one hour with 50 ml. of pyridine and 25 ml. of acetic anhydride. Excess reagents were removed by warming in vacuo and the residual oil was dissolved in ether. The solution was washed with 2 N sodium hydroxide, 2 N hydrochloric acid and saturated salt solution, and was concentrated to an oily residue. The residue in 1:9 ether-pentane was poured onto a column of 500 g. of silica gel. The column was eluted with 4 l. of this same 1:9 mixture to give 13 g. of an oil which will be referred to below as Mixture A. Further elution with 9 l. of the 1:9 solvent mixture followed by 13 l. of a 1:4 ether-pentane mixture afforded 5.5 g. of crystalline solid.

The 5.5 g. sample was dissolved in 50 ml. of hot methanol and the solution was concentrated to a 20 ml. volume. The solution was cooled to 6° C. and the precipitate of colorless plates was collected (3.2 g.). This product was recrystallized from methanol to give 2.85 g. of 17β-acetoxyandrostan-2-one (V, acetate), M.P. 148–150° C. One further recrystallization raised the melting point to 149.2–150.0° C. (corr.); $[\alpha]_D^{25} = +26.8°$ (chloroform).

Immediately following the separation of the 3.2 g. of 2-ketone above, a heavy precipitation of needles occurred in the filtrate. This solid was collected (1.0 g.) and recrystallized twice from methanol to give 0.8 g. of 17β-acetoxyandrostan-2-one dimethylketal, M.P. 142.5–144.5° C.; $[\alpha]_D^{25} = 5.2°$ (chloroform).

Mixture A, described above, was rechromatographed on 280 g. of neutral alumina. Elution of the column with 5% ether-95% pentane caused immediate removal of 2.65 g. of oily 17β-acetoxy-3,3-bis(n-propylmercapto)androstane (VIII, R is $CH_3CH_2CH_2$, R' is $COCH_3$) which solidified. One recrystallization from methanol gave 2.0 g. of fine needles, M.P. 96.5–98° C. This melting point was undepressed upon admixture of the material with an authentic sample M.P. 96.5–98° C. prepared from 17β-acetoxy-5α-androstan-3-one and n-propylmercaptan in the presence of boron trifluoride etherate, and the infrared spectra of the two samples were identical.

When dioxane was substituted for chloroform as the solvent similar results were obtained. The reaction was also successful when the n-propylmercaptan was replaced by equivalent amounts of methylmercaptan, isopropylmercaptan or isobutylmercaptan.

The starting 2α-bromo-17β-acetoxyandrostan-3-one can be replaced by the free carbinol, 2α-bromoandrostan-17β-ol-3-one, or by other lower-carboxylic acid esters thereof, e.g., the propionate, caproate, benzoate, p-nitrobenzoate, β-cyclohexylpropionate, hemisuccinate, cinnamate, and the like.

EXAMPLE 2.—Preparation of 17β-acetoxyandrostan-2-one under optimum conditions

A mixture of 157.5 g. (0.384 mole) of 17β-acetoxy-2α-bromoandrostan-3-one, 118.5 g. (1.55 moles) of n-propylmercaptan and 1750 ml. of chloroform was refluxed in a nitrogen atmosphere for fourteen hours and then concentrated in vacuo to a residual oil. This oil was dissolved in a mixture of 1 l. of methanol, 50 ml. of concentrated hydrochloric acid and 50 ml. of water. The resultant cloudy solution was refluxed with stirring for four hours. During this reflux period, 10 ml. portions of water were added every fifteen minutes. Finally, 1.5 l. of water was added and the mixture was distilled under water pump vacuum. As the volume of the still pot contents diminished, 5% aqueous hydrochloric acid was added to maintain approximately the original volume. After 8 l. of distillate had been collected no further oily droplets could be observed co-distilling with the water. The pot contents were cooled, and the solid material was collected and dried.

The solid material was heated at 100° C. for one hour with 250 ml. of acetic anhydride and 500 ml. of pyridine and the cooled mixture was poured into 10 l. of cold water. The precipitated solid was collected and air-dried.

A solution of the solid reaction product in 3 l. of boiling methanol was treated with a solution of 450 g. of sodium metabisulfite in 2.2 l. of water at 25° C. This mixture was stirred for fifteen minutes and then diluted with 2.5 l. of methylene dichloride and 2.5 l. of water. Stirring was continued for fifteen minutes. The mixture was filtered, the layers of the filtrate were separated and the water layer and the solid were set aside. The organic layer was dried over sodium sulfate and concentrated to a solid residue. This residue was dissolved in 250 ml. of acetone and 250 ml. of hexane, the solution was decolorized with activated charcoal and filtered, and the filtrate was concentrated to a 100 ml. volume. Cooling afforded 50 g. of 17β-acetoxyandrostan-2-one, M.P. 147–150° C. Further recrystallization of the product and reworking of the mother liquors gave a 41.5% total yield of material melting at 150–151° C.

The water layer and the solid which were set aside in the bisulfite separation just described were combined, treated with 4 l. of methylene dichloride and 500 g. of sodium bicarbonate and heated for five hours under reflux. The mixture was cooled, filtered, and the methylene dichloride layer of the filtrate was dried over sodium sulfate. This solution was concentrated to a residual solid which was heated for one hour at 100° C. with 50 ml. of acetic anhydride and 100 ml. of pyridine. Cooling of the reaction mixture and dilution with 3 l. of cold water gave a solid which was recrystallized once from ethyl acetate. The 17$\beta$-acetoxy-5$\alpha$-androtsan-3-one so obtained (62 g., 49% yield) melted at 156–159° C. Its identity was confirmed by infrared spectral comparison with an authentic sample.

The foregoing procedure can be applied to other 2$\alpha$-bromo-3-oxo-steroids of the A/B trans configuration bearing substituents inert under the conditions of the process. For example, cholestan-2-one was prepared from 2$\alpha$-bromocholestan-3-one as follows:

EXAMPLE 3

A solution of 6.96 g. (0.0145 mole) of 2$\alpha$-bromocholestan-3-one and 4.40 g. (0.058 mole) of n-propylmercaptan in 150 ml. of chloroform was refluxed for seven hours and then concentrated in vacuo to remove the volatile solvent. The residual oil was dissolved in 250 ml. of 1:9 ether-pentane and poured onto a column of 250 g. of silica gel. Elution of the column with 1 liter of the same solvent mixture afforded 5.64 g. of an oily mixture. Further elution of the column brought out crystalline material which when recrytsallized from acetone gave 1.45 g. of cholestan-2-one in the form of colorless blades, M.P. 128–130° C., $[\alpha]_D^{25} = +49.4°$ (1% in chloroform).

EXAMPLE 4.—17$\beta$-hydroxyandrostan-2-one V

17$\beta$-acetoxyandrostan-2-one (1.76 g., 0.0053 mole) was treated with 1.05 g. (0.16 mole) of 85% potassium hydroxide pellets in 75 ml. of 95% ethanol at boiling temperature for ninety minutes. Acetic acid (2 ml.) was added and the volatile solvent was removed by warming in vacuo. The solid residue was partitioned between water and ether. The ether layer was separated, washed with saturated salt solution, dried over sodium sulfate and concentrated to dryness. Recrystallization of the residue from ethyl acetate gave 1.43 g. of 17$\beta$-hydroxyandrostan-2-one in the form of colorless blades, M.P. 178.0–180.0° C. (corr.); $[\alpha]_D^{25} = +47.6°$ (chloroform).

17$\beta$-acetoxyandrostan-2-one dimethylketal (0.40 g.) was refluxed for two hours in aqueous alcoholic sodium hydroxide solution and the solution was concentrated in vacuo until all alcohol was removed. Water was added to the residual suspension and the solid present was collected. It was recrystallized twice from methanol to give 0.18 g. of 17$\beta$-hydroxyandrostan-2-one dimethylketal in the form of colorless tablets, M.P. 185–187.5° C., $\lambda_{max.}^{KBr}$ 2.92, 6.85 and 6.94$\mu$, $[\alpha]_D^{25} = +11.1°$ (chloroform)

EXAMPLE 5.—17$\beta$-acetoxyandrostan-2-one oxime

A solution of 7.00 g. (0.021 mole) of 17$\beta$-acetoxyandrostan-2-one and 7.00 g. (0.10 mole) of hydroxylamine hydrochloride in 175 ml. of absolute ethanol was refluxed for eighteen hours and concentrated to a residue in vacuo. The residue was partitioned between water and methylene dichloride, the layers were separated and the organic layer was washed with 2 N hydrochloric acid and dried over sodium sulfate, and then concentrated to dryness. This residue was dissolved in 2:1:7 methylene dichloride-ether-pentane, and this solution was poured onto a 250 g. column of silica gel. Elution with 1:9 ether-pentane gradually changed to 4:6 ether-pentane brought out 6.06 g. of oxime which was recrystallized from ethyl acetate to give 4.53 g. of 17$\beta$-acetoxyandrostan-2-one oxime of M.P. 204.6–209.6° C. (corr.), $[\alpha]_D^{25} = -63.1°$ (chloroform).

17$\beta$-acetoxyandrostan-2-one oxime was found to possess antihypertensive activity when administered to renal hypertensive rats at a dose level of 100 mg./kg.

The acetate of 17$\beta$-acetoxyandrostan-2-one oxime was prepared as follows. A solution of 2.69 g. of 17$\beta$-acetoxyandrostan-2-one oxime in 10 ml. of acetic anhydride and 20 ml. of pyridine was heated on the steam bath for one hour, cooled and poured into 300 ml. of water. The precipitated solid was collected and recrystallized once from methanol to give 1.27 g., M.P. 161–166° C. A second recrystallization from methanol afforded a sample having the M.P. 167.8–170.0° C. (corr.), $[\alpha]_D^{25} = -61.0°$ (chloroform).

EXAMPLE 6.—2$\alpha$-methylandrostane-2$\beta$,17$\beta$-diol

A solution of 4.0 g. (0.014 mole) of 17$\beta$-hydroxy-5$\alpha$-androstan-2-one in 50 ml. of tetrahydrofuran and 50 ml. of ether was treated dropwise with stirring with 30 ml. of 3 M methyl-magnesium bromide (0.09 mole). The mixture was refluxed with stirring for two hours, cooled and treated with 30 ml. of saturated aqueous ammonium chloride. The layers were separated, the water layer was extracted with ether and the combined either solutions were concentrated to dryness. This residue was dissolved in 100 ml. of methylene dichloride, and the solution was diluted with 50 ml. of ether and 350 ml. of pentane, and then poured onto 200 g. of silica gel. Elution with 3:7 ether-pentane afforded 2.6 g. of the desired diol which was recrystallized twice from methanol to give 2.1 g. of 2$\alpha$-methlandrostane-2$\beta$,17$\beta$-diol, M.P. 193.2–197.2° C. (corr.), $[\alpha]_D^{25} = +16.0°$ (1% in EtOH).

EXAMPLE 7.—2$\alpha$-methylandrostan-2$\beta$-ol-17-one

A solution of 1.10 g. (0.0036 mole) of 2$\alpha$-methyl-5$\alpha$-androstane-2$\beta$-17$\beta$-diol in 50 ml. of acetic acid was cooled to 16° C. and treated with 0.39 g. (0.0039 mole) of chromium trioxide in 1 ml. of water and 25 ml. of acetic acid dropwise with stirring at 16–20° C. during thirty minutes. The mixture was stirred for three hours, diluted with 500 ml. of water, and the precipitated solid was collected and air-dried. This solid (1.0 g.) was dissolved in 20 ml. of methylene dichloride, 40 ml. of ether and 55 ml. of pentane and the solution was percolated through 25 g. of silica gel, the column having been washed with 2:3 ether-pentane. Concentration of the first 600 ml. of eluate and recrystallization of the residue from methanol afforded 0.80 g. of 2$\alpha$-methylandrostan-2$\beta$-ol-17one, M.P. 197–201° C. A second recrystallization from methanol gave 0.65 g. of colorless, massive prisms, M.P. 199.2–202.5° C. (corr.), $[\alpha]_D^{25} = +91.4°$ (1% in chloroform).

EXAMPLE 8

2$\alpha$,17$\alpha$-dimethylandrostane-2$\beta$,17$\beta$-diol was prepared from 2.93 g. (0.0096 mole) of 2$\alpha$-methyl-5$\alpha$-androstan-2$\beta$-ol-17-one in 75 ml. of tetrahydrofuran and 15 ml. of 3 M methylmagnesium bromide (0.045 mole) according to the procedure described above in Example 6. The product was recrystallized from acetone to give 2$\alpha$,17$\alpha$-dimethylandrostane-2$\beta$,17$\beta$-diol, M.P. 186.8–194.8° C. (corr.), $[\alpha]_D^{25} = -2.1°$ (1% in chloroform).

EXAMPLE 9.—17$\beta$-acetoxy-2-n-propylmercaptoandrostan-3-one (II; R is $CH_3CH_2CH_2$, R' is $COCH_3$)

A mixture of 16.4 g. (0.040 mole) of 2$\alpha$-bromo-17$\beta$-acetoxyandrostan-3-one (I) and 3.34 g. (0.044 mole) of n-propylmercaptan in 250 ml. of dry t-butyl alcohol was refluxed for five and one-half hours, and then concentrated to remove the volatile solvent by warming in vacuo. The residual oil was diluted with 25 ml. of ether and 475 ml. of pentane and poured onto 300 g. of silica gel. The first 25 l. of eluate contained negligible material and the first solid subsequently eluted was mushy and was discarded (less than 1 g.). The desired product was then collected and recrystallized three times from methanol to give 4.55 g. of 17β-acetoxy-2-n-propylmercaptoandrostan-3-one in the form of colorless, massive prisms, M.P. 116–118.5° C., and a second crop of 1.04 g., M.P. 113–117° C.

By replacing the 2α-bromo-17β-acetoxyandrostan-3-one in the foregoing preparation by a molar equivalent amount of 2α-bromoandrostan-17β-ol-3-one, 2α-bromo-17β-benzoyloxyandrostan-3-one or 2α-bromo-17β-cinnamoyloxyandrostan-3-one, there can be obtained, respectively, 2-n-propylmercaptoandrostan - 17β - ol - 3 - one (II; R is $CH_3CH_2CH_2$, R' is H), 17β-benzoyloxy-2-n-propylmercaptoandrostan-3-one (II; R is $CH_3CH_2CH_2$, R' is $COC_6H_5$) or 17β-cinnamoyloxy-2-n-propylmercaptoandrostan-3-one (II; R is $CH_3CH_2CH_2$, R' is $COCH=CHC_6H_5$).

By replacing the n-propylmercaptan in the foregoing preparation by a molar equivalent amount of methylmercaptan or n-hexylmercaptan, there can be obtained, respectively, 17β-acetoxy-2-methylmercaptoandrostan-3-one (II; R is $CH_3$, R' is $COCH_3$) or 17β-acetoxy-2-n-hexylmercaptoandrostan-3-one (II; R is $CH_3(CH_2)_5$, R' is $COCH_3$).

EXAMPLE 10.—17β-acetoxy-2,3-bis(n-propylmercapto)-2-androstene (III; R is $CH_3CH_2CH_2$, R' is $COCH_3$)

A mixture of 16.0 g. (0.039 mole) of 2α-bromo-17β-acetoxyandrostan-3-one and 12.2 g. (0.16 mole) of n-propylmercaptan in 350 ml. of dry t-butyl alcohol was refluxed for five and one-half hours, and then concentrated to remove volatile solvent by warming in vacuo. The residual oil was diluted with 25 ml. of ether and 475 ml. of pentane and poured onto a silica gel column (500 g.). Elution of the column with 2 l. of 1:19 ether-pentane removed di-n-propyl disulfide (0.36 g.) and the same solvent mixture removed the desired product which was recrystallized from 11 ml. of absolute ethanol to give 8.7 g. of 17β-acetoxy-2,3-bis(n-propylmercapto)-2-androstene in the form of long, colorless prisms, M.P. 48–54° C. Two further recrystallizations afforded 7.35 g. of material melting at 50–53.5° C., $[\alpha]_D^{25}=+58.8°$ (chloroform), $\epsilon_{221\,m\mu}$ 5710 and $\epsilon_{253\,m\mu}$ 5660.

Further elution of the column with the same solvent afforded 17β-acetoxy-2-n-propylmercaptoandrostan-3-one (II; R is $CH_3CH_2CH_2$, R' is $COCH_3$) which was recrystallized four times from methanol to give 1.35 g. of massive prisms, M.P. 116.8–119.6° C. (corr.), $[\alpha]_D^{25}=+66.0°$ (chloroform), $\epsilon_{248\,m\mu}$ 320 and $\epsilon_{302\,m\mu}$ 250.

By replacing the 2α-bromo-17β-acetoxyandrostan-3-one in the foregoing preparation by a molar equivalent amount of 2α-bromo-androstan-17β-ol-3-one, 2α-bromo-17β-benzoyloxyandrostan-3-one or 2α-bromo-17β-cinnamoyloxyandrostan-3-one, there can be obtained, respectively, 2,3-bis(n-propylmercapto)-2-androsten-17β-ol (III; R is $CH_3CH_2CH_2$, R' is H), 17β-benzoyloxy-2,3-bis(n-propylmercapto)-2-androstene (III; R is $CH_3CH_2CH_2$, R' is $COC_6H_5$) or 17β-cinnamoyloxy-2,3-bis(n-propylmercapto)-2-androstene (III; R is $CH_3CH_2CH_2$, R' is $COCH=CHC_6H_5$).

By replacing the n-propylmercaptan in the foregoing preparation by a molar equivalent amount of methylmercaptan or n-hexylmercaptan, there can be obtained, respectively, 17β-acetoxy-2,3-bis(methylmercapto)-2-androstene (III; R is $CH_3$, R' is $COCH_3$) or 17β-acetoxy-2,3-bis(n-hexylmercapto)-2-androstene (III; R is $CH_3(CH_2)_5$, R' is $COCH_3$).

Desulfurization of 17β-acetoxy-2-n-propylmercaptoandrostan-3-one and 17β-acetoxy-2,3-bis(n-propylmercapto)-2-androstene with Raney nickel gave, respectively, 17β-acetoxyandrostan-3-one, M.P. 158.5–160° C., and 17β-acetoxy-2-androstene, M.P. 92.5–95° C., identical with authentic samples of these known compounds.

EXAMPLE 11.—17β-acetoxy-3-n-propylmercapto-2-androstene (VI; R is $CH_3CH_2CH_2$, R' is $COCH_3$)

A solution of 9.58 g. of 17β-acetoxy-3,3-bis(n-propylmercapto)androstan-3-one (Example 1) and 0.3 g. of p-toluenesulfonic acid monohydrate in 100 ml. of benzene was boiled slowly for four hours. Fresh benzene was added occasionally to maintain the volume. The solvent was then removed by warming in vacuo, the residual oil was dissolved in ether and this solution was washed with dilute sodium hydroxide solution and dried over sodium sulfate. Removal of solvent gave a pasty solid which was triturated with one 5-ml. portion and three 2-ml. portions of methanol containing a trace of pyridine. The resulting powdery solid was recrystallized from 45 ml. of methanol to give 1.7 g. of 17β-acetoxy-3-n-propylmercapto-2-androstene. A single further recrystallization gave a sample of the M.P. 75.4–76.2° C. (corr.), $[\alpha]_D^{25}=+60.6°$ (chloroform), $\epsilon_{223\,m\mu}$ 4900 and $\epsilon_{238-243\,m\mu}$ 3500.

17β-acetoxy-3-n-propylmercapto-2-androstene can be hydrolyzed to 3-n-propylmercapto-2-androsten-17β-ol (VI; R is $CH_3CH_2CH_2$, R' is H) by warming it with a methanolic solution of potassium hydroxide.

EXAMPLE 12.—17β-acetoxy-2-n-propylmercapto-2-androstene (IV; R is $CH_3CH_2CH_2$, R' is $COCH_3$)

A solution of 2.0 g. of 17β-acetoxyandrostan-2-one and 2.0 g. of n-propylmercaptan in 30 ml. of benzene was treated with 4 drops of boron trifluoride ethereate and allowed to stand for two days. Water droplets separated from the solution. The mixture was concentrated to a residue by warming below 35° C. in vacuo, the residue was dissolved in ether and this solution was washed with 2 N sodium hydroxide solution, and then dried over sodium sulfate. Concentration of the ether solution gave an oil which was dissolved in 10 ml. of pentane. A solid precipitated which was collected and washed with two 5-ml. portions of cold pentane. This solid, 0.87 g., melted at 148.5–150° C. and consisted of starting material.

The filtrate was concentrated to a residual oil which solidified when chilled. This solid was slurried with 5 ml. of cold methanol containing a trace of pyridine and the solid was collected. It was then crystallized from 10 ml. of methanol containing a drop of pyridine to give 0.58 g. of colorless needles of 17β-acetoxy-2-n-propylmercapto-2-androstene, M.P. 59–60.5° C. A second recrystallization from the same solvent gave material which melted at 60.5–62° C., resolidified, and then melted at 70.0–70.5° C.; $[\alpha]_D^{25}=+52.2°$ (chloroform), $\epsilon_{223\,m\mu}$ 4200, $\epsilon_{238-243\,m\mu}$ 3100.

By repacing the n-propylmercaptan in the foregoing preparation by a molar equivalent amount of methylmercaptan or n-hexylmercaptan, there can be obtained, respectively, 17β-acetoxy-2-methylmercapto-2-androstene (IV; R is $CH_3$, R' is $COCH_3$) or 17β-acetoxy-2-n-hexylmercapto - 2 - androstene (IV; R is $CH_3(CH_2)_5$, R' is $COCH_3$).

By replacing the 17β-acetoxyandrostan - 2 - one in the foregoing preparation by a molar equivalent amount of androstan-17β-ol-2-one, there can be obtained 2-n-propylmercapto-2-androsten-17β-ol (IV; R is $CH_3CH_2CH_2$, R' is H).

EXAMPLE 13.—17β-acetoxy-2,3-bis(n-propanesulfonyl)-2-androstene

A solution of 3.0 g. (0.0065 mole) of 17β-acetoxy-2,3-bis(n-propylmercapto)-2-androstene (Example 10) in 15 ml. of acetic acid was treated with 6 g. (0.5 mole) of 30% hydrogen peroxide in 1 g. portions. The temperature rose spontaneously to 46° C., then dropped. This solution was heated at 60° C. for nineteen hours, cooled and poured into water. The solid which precipitated was collected, air-dried and recrystallized from methanol to give 2.85 g. of colorless needles, M.P. 140.5–144.5° C. Chromaotgraphy of this solid on 100 g. of silica gel using ether-pentane mixtures (finally 3:7) for elution afforded 17β-acetoxy - 2,3 - bis(n-propanesulfonyl)-2-androstene which was recrystallized from methanol to give 1.97 g. of needles, M.P. 147.4–148.8° C. (corr.), $[\alpha]_D^{25}=+82.8°$ (chloroform), $\epsilon_{215\,m\mu}$ 9300.

17β - acetoxy-2,3-bis(n-propanesulfonyl)-2-androstene can be hydrolyzed by warming with a methanolic solution of potassium hydroxide to give 2,3 - bis(n - propanesulfonyl)-2-androstene-17β-ol.

EXAMPLE 14.—17β-acetoxy-3-n-propanesulfonyl-2-androstene

A stirred solution of 4.2 g. (0.011 mole) of 17β-acetoxy-3-n-propylmercapto-2-androstene (Example 11) in 50 ml. of ether at −30° C. was treated with 93 ml. (0.051 mole) of an ethereal solution of monoperphthalic acid which contained 100 mg. of peracid per ml. of solution. The resulting solution was allowed to warm to room temperature and stand for six days, was filtered, and the filtrate was washed with 10% sodium carbonate, dried over sodium sulfate and concentrated to a residual oil which solidified. Two recrystallizations from methanol afforded 2.68 g. of colorless needles, M.P. 120–129° C. The product was recrystallized twice more from methanol with drying at 78°/1 mm. for eight hours to give 17β-acetoxy-3-n-propanesulfonyl - 2 - androstene, M.P. 126.0–129.2° C. (corr.); $[\alpha]_D^{25}=+45.4°$ (chloroform).

17β - acetoxy-3-n-propanesulfonyl-2-androstene can be hydrolyzed by warming with a methanolic solution of potassium hydroxide to give 3-n-propanesulfonyl-2-androsten-17β-ol.

EXAMPLE 15

17β-acetoxy-2-n-propanesulfonyl-2-androstene was prepared from 17β-acetoxy-2-n-propylmercapto-2-androstene (2.7 g., 0.0069 mole) and 0.035 mole of ethereal perphthalic acid in the manner described above in Example 14. The product was recrystallized twice from methanol to give 1.15 g. of 17β-acetoxy-2-n-propanesulfonyl-2-androstene, M.P. 185.0–186.0° C. (corr.), $[\alpha]_D^{25}=+45.4°$ (chloroform).

17β - acetoxy-2-n-propanesulfonyl-2-androstene can be hydrolyzed by warming with a methanolic solution of potassium hydroxide to give 3-n-propanesulfonyl-2-androsten-17β-ol.

EXAMPLE 16

17β-acetoxy-3,3-bis(n-propanesulfonyl)androstane was prepared from 5.0 g. (0.011 mole) of 17β-acetoxy-3,3-bis(n - propylmercapto) - androstane (Example 1) and 0.10 mole of ethereal monoperphthalic acid in the manner described above in Example 14. The product was recrystallized from methanol to give 17β-acetoxy-3,3-bis(n-propanesulfonyl)androstane in the form of colorless needles, M.P. 137.2–139.0° C. (corr.); $[\alpha]_D^{25}=+14.0°$ (chloroform).

17β-acetoxy-3,3-bis(n-propanesulfonyl)androstane can be hydrolyzed by warming with a methanolic solution of potassium hydroxide to give 3,3-bis(n-propanesulfonyl)androstan-17β-ol.

17β-acetoxy-3,3-bis(n-propanesulfonyl)androstane was found to possess anti-pituitary and anti-cortical activity.

3,3-bis(n-propanesulfonyl)androstan-17β-ol can be oxidized with chromic acid to give 3,3′-bis(propanesulfonyl)-androstan-17-one, prisms, M.P. 145.4–148.8° C. (corr.).

EXAMPLE 17.—3-hydroxymethyleneandrostan-17β-ol-2-one

Sodium methoxide was freshly prepared by dissolving 0.70 g. (0.029 mole) of sodium hydride in 20 ml. of methanol and removing all excess methanol by warming in vacuo. Pyridine (37 ml.) was added followed by 1.95 g. (0.0067 mole) of androstan-17β-ol-2-one and 4 ml. of ethyl formate. This mixture was allowed to stand at room temperature for eighteen hours and then concentrated to a residue by warming in vacuo. The residue was partitioned between water and ether, and the water layer was separated and treated with carbon dioxide until the pH of the solution fell to 7.5. Extraction with ether separated the product which was then recrystallized twice from acetonitrile to give 3-hydroxymethyleneandrostan-17β-ol-2-one in the form of colorless massive prisms, M.P. 141.2–142.4° C. (corr.) (evacuated capillary), $[\alpha]_D^{25}=+47.4°$ (chloroform); $\epsilon_{282\,m\mu}$ 9000.

EXAMPLE 18.—3-diethylaminomethyleneandrostan-17β-ol-2-one [IX; B=N is $(C_2H_5)_2N$, R′ is H]

A mixture of 2.0 g. (0.0063 mole) of 3-hydroxymethyleneandrostan-17β-ol-2-one (Example 17), 50 ml. of benzene and 3 ml. of diethylamine was refluxed for two hours with a water separator attached to the system. Concentration of the reaction mixture by warming in vacuo afforded a residue which was recrystallized once from acetonitrile to give 1.80 g. of pale yellow needles, M.P. 229–236° C. A second recrystallization afforded 1.56 g. of material which melted at 229–237° C. (immersed at 200° C. and heated at 3°/min.). This melting point varied with rate of heating and temperature of immersion of the sample. The product showed $[\alpha]_D^{25}=-65.7°$ (chloroform) and $\epsilon_{333\,m\mu}$ 22,600.

By replacement of the diethylamine in the foregoing preparation by a molar equivalent amount of di-n-hexylamine, pyrrolidine, piperidine, morpholine, piperazine, 3-methylpyrrolidine, 4-ethylpiperidine, 2-methylmorpholine or 4-methylpiperazine, there can be obtained, respectively, 3 - (di - n - hexylamino)methyleneandrostan-17β-ol-2-one [IX; B=N is $(n-C_6H_{14})_2$ N, R′ is H], 3-(1 - pyrrolidyl)methyleneandrostan - 17β - ol - 2-one [IX; B=N is 1-pyrrolidyl, R′ is H], 3-(1-piperidyl)-methyleneandrostan-17β-ol-2-one [IX; B=N is 1-piperidyl, R′ is H], 3 - (4-morpholinyl)methyleneandrostan-17β-ol-2-one [IX; B=N is 4-morpholinyl, R′ is H], 3-(1-piperazinyl)methyleneandrostan-17β-ol-2-one [IX; B=N is 1-piperazinyl, R′ is H], 3-(3-methy-1-pyrrolidyl)methyleneandrostan-17β-ol-2-one, 3-(4-ethyl-1-piperidyl)methyleneandrostan-17β-ol-2-one, 3-(2-methyl-4-morpholinyl)methyleneandrostan-17β-ol-2-one, or 3-(4-methyl-1-piperazinyl)methyleneandrostan-17β-ol-2-one.

3-diethylaminomethyleneandrostan-17β-3-one can be caused to react with acetic anhydride, caproyl chloride, succinic anhydride, β-cyclopentylpropionic anhydride, benzoyl chloride, p-nitrobenzoyl chloride or cinnamoyl chloride, in the presence of pyridine, to give, respectively, the 17-acetate, 17-caproate, 17-hemisuccinate, 17-(β-cyclopentylpropionate), 17-benzoate, 17-(p-nitrobenzoate) or 17-cinnamate of 3-diethylaminomethyleneandrostan-17β-ol-2-one.

EXAMPLE 19.—17β-hydroxyandrostano[2,3-c]pyrazole

A mixture of 2.00 g. (0.0063 mole) of 3-hydroxymethyleneandrostan-17β-ol-2-one (Example 17), 2 g. of 100% hydrazine hydrate and 25 ml. of absolute ethanol was heated under reflux for thirty minutes, cooled and diluted with 100 ml. of water. The white solid which separated was collected, air-dried and recrystallized twice from acetone to give 1.60 g. of 17β-hydroxyandrostano [2,3-c]pyrazole containing a half molecule of acetone of crystallization, colorless prisms, M.P. 233–234° C. (corr.), $[\alpha]_D^{25}=+50.3°$ (1% in EtOH), $\epsilon_{224\,m\mu}$ 5,200.

17β-hydroxyandrostano[2,3-c]pyrazole can be caused to react with acetic anhydride or β-cyclopentylpropionic anhydride in the presence of pyridine to give the 17-acetate or 17-(β-cyclopentylpropionate), respectively.

EXAMPLE 20.—17β-acetoxyandrostanol[2,3-c]isoxazole

A mixture of 3.28 g. (0.040 mole) of fused sodium acetate, 2.92 g. (0.042 mole) of hydroxylamine hydrochloride, 8.60 g. (0.027 mole) of 3-hydroxymethyleneandrostan-17β-ol-2-one (Example 17) and 270 ml. of acetic acid was warmed at 65–70° C. with stirring for six hours, and then concentrated by warming in vacuo. The residue was partitioned between water and ether, the layers were separated, and the ether layer was washed with saturated sodium bicarbonate solution, dried over sodium sulfate and concentrated.

The 10.68 g. residue present at this point was a mixture of 17β-hydroxyandrostano[2,3-c]isoxazole and 17β-hydroxyandrostano[3,2-d]isoxazole. The mixture was dissolved in 330 ml. of tetrahydrofuran, 2.65 g. (0.049 mole) of sodium methoxide was added and the mixture was allowed to stand for ninety minutes. The mixture was concentrated in vacuo, water and ether were added, the layers were separated, and the ether layer was washed with 2N sodium hydroxide, dried over sodium sulfate and concentrated. Recrystalliaztion of the residue from methanol afforded 5.0 g. of 17β-hydroxyandrostano[2,3-c]isoxazole, M.P. 174–178° C. after shrinking at about 169° C. This product was found to contain methanol of solvation which was difficult to remove entirely so the compound was converted to its acetate by means of acetic anhydride and pyridine using a one-hour heating period followed by dilution with water. Recrystallization from methanol and drying for six hours at 100°/10 mm. afforded 4.37 g. of 17β-acetoxyandrostano[2,3-c]isoxazole, M.P. 177.4–178.2° C. (corr.), $[\alpha]_D^{25} = +39.2°$ (1% in chloroform).

The water layer from the reaction of the isoxazole mixture with sodium methoxide in tetrahydrofuran was treated with carbon dioxide until the pH of the mixture fell to 7.5. The gum which separated was extracted with ether and the extract was dried over sodium sulfate and concentrated. The residue was dissolved in hot methanol, water was added until cloudiness developed and the mixture was cooled to give 1.68 g. of 3β-cyanoandrostan-17β-ol-2-one which partially melted and resolidified at 68–74° C. and then decomposed at 96° C.

I claim:
1. The process for preparing a 2-oxo-steroid having the A/B trans configuration which comprises heating a 2α-bromo-3-oxo-steroid having the A/B trans configuration with at least about three molar equivalents of a lower-alkylmercaptan, and hydrolyzing the product in the presence of dilute acid.
2. The process for preparing androstan-17β-ol-2-one which comprises heating a member of the group consisting of 2α-bromoandrostan-17β-ol-3-one and lower-carboxylic acid esters thereof with at least about three molar equivalents of a lower-alkylmercaptan, and hydrolyzing the product in the presence of dilute acid.
3. Androstan-17β-ol-2-one.
4. 17β-acetoxyandrostan-2-one.
5. 17β-acetoxyandrostan-2-one oxime.
6. 17β-acetoxyandrostan-2-one oxime acetate.
7. 2α-methylandrostane-2β,17β-diol.
8. 2α-methylandrostan-2β-ol-17-one.
9. 2α,17α-dimethylandrostane-2β,17β-diol.
10. A compound of the formula

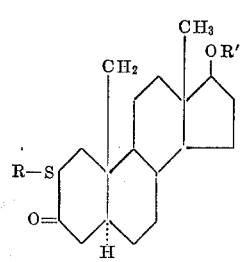

wherein R is lower-alkyl and R' is a member of the group consisting of hydrogen and lower-carboxylic acyl.

11. A compound of the formula

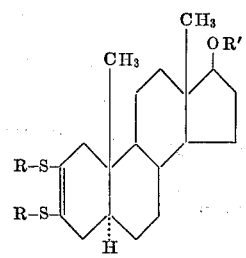

wherein R is lawer-alkyl and R' is a member of the group consisting of hydrogen and lower-carboxylic acyl.

12. A compound of the formula

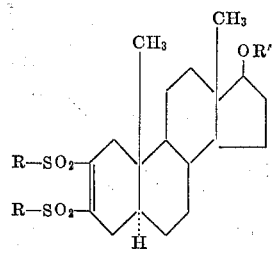

wherein R is lower-alkyl and R' is a member of the group consisting of hydrogen and lower-carboxylic acyl.

13. A compound of the formula

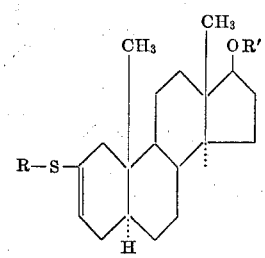

wherein R is lower-alkyl and R' is a member of the group consisting of hydrogen and lower-carboxylic acyl.

14. A compound of the formula

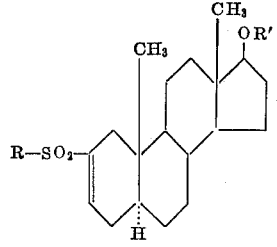

wherein R is lower-alkyl and R' is a member of the group consisting of hydrogen and lower-carboxylic acyl.

15. A compound of the formula

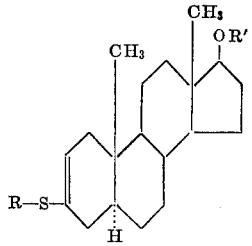

wherein R is lower-alkyl and R' is a member of the group consisting of hydrogen and lower-carboxylic acyl.

16. A compound of the formula

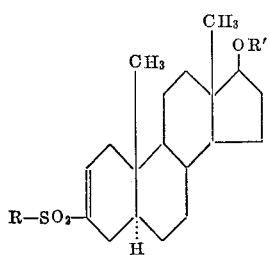

wherein R is lower-alkyl and R' is a member of the group consisting of hydrogen and lower-carboxylic acyl.

17. A compound of the formula

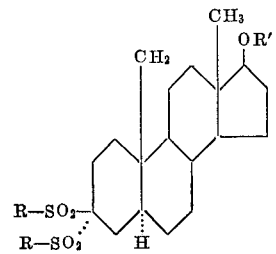

wherein R is lower-alkyl and R' is a member of the group consisting of hydrogen and lower-carboxylic acyl.

18. 3,3'-Bis(n-propanesulfonyl)androstan-17-one.
19. 3-Hydroxymethyleneandrostan-17β-ol-2-one.
20. A compound of the formula

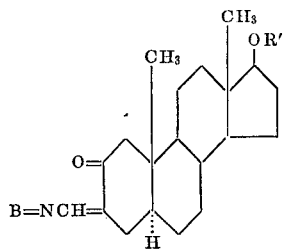

wherein R' is a member of the group consisting of hydrogen and lower-carboxylic acyl, and B=N is a member of the group consisting of di-lower-alkylamino, 1-piperidyl, lower-alkylated 1-piperidyl, 1-pyrrolidyl, lower-alkylated 1-pyrrolidyl, 4-morpholinyl, lower-alkylated 4-morpholinyl, 1-piperazinyl and lower-alkylated 1-piperazinyl.

21. A member of the group consisting of 17β-hydroxy-androstano[3,2-d]isoxazole, and lower-carboxylic acid esters thereof.

22. 3β-cyanondrostan-17β-ol-2-one.

23. A compound of the following formula:

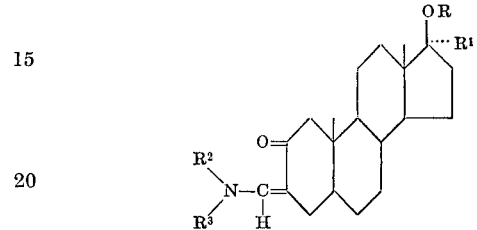

wherein R is selected from the group consisting of hydrogen and a hydrocarbon carboxylic acyl group of less than 12 carbon atoms; $R^1$ is hydrogen; $R^2$ and $R^3$ are lower alkyl; and $R^2$ and $R^3$ together with the nitrogen atom form a heterocyclic radical selected from the group consisting of piperidino, morpholino and pyrrolidino.

24. 3-N,N-diethylaminomethylene - androstan - 17β-ol-2-one.

25. Isoxazolo(5',4';2,3)-androstan-17β-ol.

References Cited

UNITED STATES PATENTS 3,280,113    10/1966    Christiansen et al.

HENRY A. FRENCH, *Primary Examiner.*

U.S. Cl. X.R.

260—229.55, 397.3, 397.4, 397.5; 167—74

UNITED STATES PATENT OFFICE
CERTIFICATE OF CORRECTION

Patent No. 3,415,816           Dated December 10, 1968

Inventor(s) Robert L. Clarke

It is certified that error appears in the above-identified patent and that said Letters Patent are hereby corrected as shown below:

Column 1, line 17, "process of aspect" should read --process aspect--. Column 4, line 55, "or the preparation" should read --for the preparation--; line 56, "aspects" should read --aspect--. Column 8, line 26, "either" should read --ether--. Column 12, line 43, "-3-one" should read -- -2-one--; line 69, "-acetoxyandrostanol" should read -- -acetoxyandrostano--. Column 13, lines 60-70, Claim 10, left-hand portion of formula,

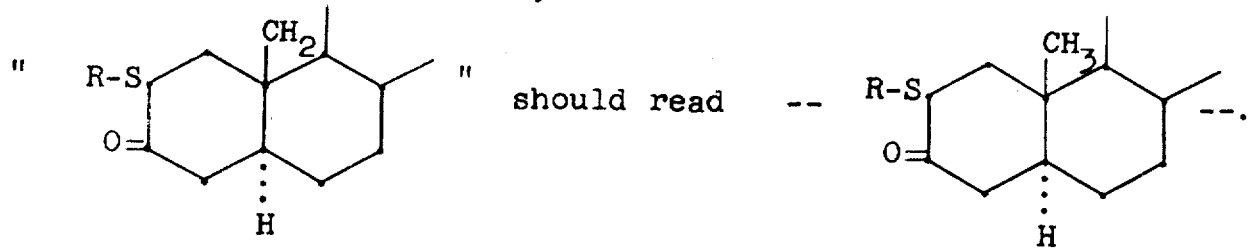

Column 14, line 14, Claim 11, "lawer" should read --lower--.
Column 15, lines 15-25, Claim 17, left-hand portion of formula,

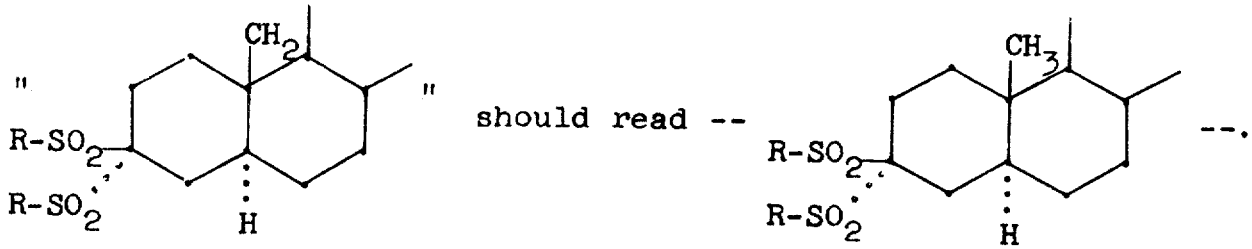

Column 16, line 11, Claim 22, "cyanondrostan" should read --cyanoandrostan--.

SIGNED AND
SEALED
AUG 18 1970

(SEAL)
Attest:

Edward M. Fletcher, Jr.
Attesting Officer

WILLIAM E. SCHUYLER, JR.
Commissioner of Patents